June 8, 1965

C. A. OWEN 3,188,035

MECHANICAL TILT COUPLING

Filed March 27, 1963

INVENTOR.
CYDWEL A. OWEN

BY

*Robert W. Ely*

ATTORNEY

United States Patent Office 3,188,035
Patented June 8, 1965

3,188,035
MECHANICAL TILT COUPLING
Cydwel A. Owen, Clinton, N.Y., assignor to The Bendix Corporation, Utica, N.Y., a corporation of Delaware
Filed Mar. 27, 1963, Ser. No. 268,377
5 Claims. (Cl. 248—204)

This invention relates to mechanical couplings and more particularly concerns such couplings which provide limited tilting of device in respect to a fixed support.

An object of the present invention is to provide an improved mechanical coupling which permits tilting without the high friction of sliding surfaces.

Another object is to provide an improved mechanical coupling for connecting a device to be tilted to a support wherein a rolling action is provided so that a small force is required for tilting the coupling part which is connected to device urged toward the support.

An additional object is to provide an improved tilt coupling in which rolling structure is operated by an axial force to give tilting and spring means give torsional stiffness for restraining forces tending to turn or rotate the tilted part of the coupling relative to the fixed part.

A further object is the provision of a universal tilt coupling wherein a novel arrangement of lattice spring means and rolling action means gives ease of tilting, restraint to torsional forces, and absorption of axial forces applied to the tilted part of the coupling.

Figure 1:
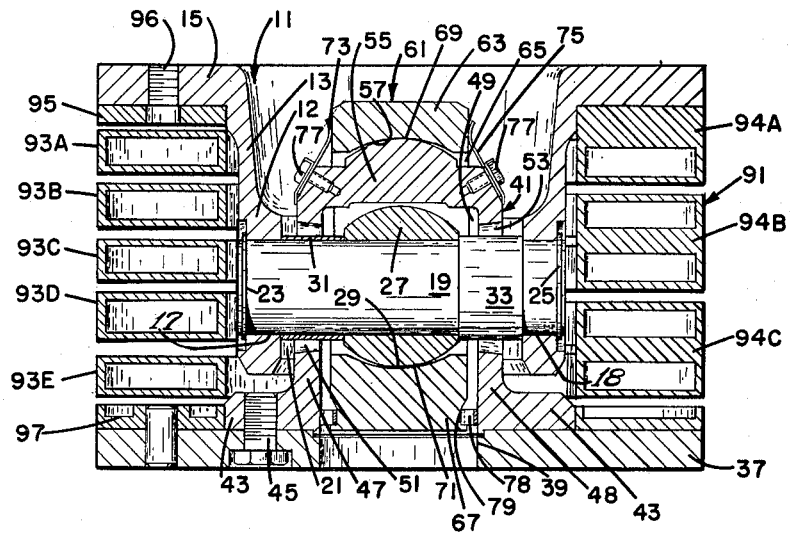
Figure 2:
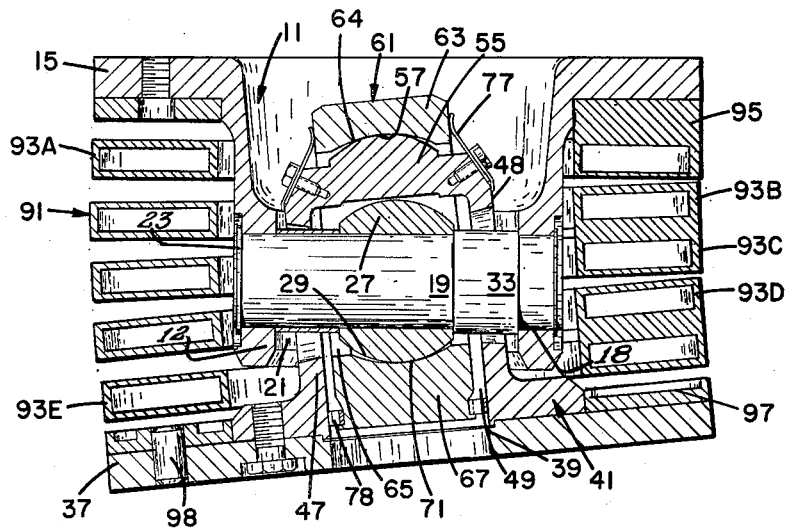

The realization of the above objects along with the features and advantages of the invention will be apparent from the following description and the accompanying drawing in which:

FIGURE 1 is a cross-sectional side view of the coupling embodying the invention and shows upper and lower attachment means connected to a cylindrical-like lattice spring having alternately offset vertical posts between hollow spring rings and means within the lattice spring which operates by an axial force with rolling action, and FIGURE 2 is a cross-sectional side view of the coupling in tilted position and shows inner rocker structure rolled relative to a ball-like element and arch-like extension having an upper convex surface and the cylindrical-like lattice spring in flexed position.

Referring to FIGURES 1 and 2 of the drawing, a tubular, upper support member 11 has an inner tubular trunnion section 12, a tubular connecting section 13, and at the top a radially-outwardly, projecting flange 15. The inner trunnion section 12 has a left hole 17 and a right hole 18. A large-diameter cross pin 19 is fitted into round holes 17 and 18 and extends horizontally from the left outer side of the tubular trunnion section 12, through the central cylindrical space 21, to the right outer side of the tubular trunnion section 12. Cross pin 19 is positioned by means of the left and right lock rings 23 and 25 fitted on the pin 19 and abutting respectively the outer sides of the tubular trunnion section 12 at left and right holes 17 and 18. A ball-like element 27 having a spherical surface 29 is mounted on the cross pin 19 and is centrally-located on the cross pin 19 by means of the left and right spacing tubes 31 and 33 fitted on pin 19 and abutting the sides of the ball-like element 27 and the interior sides of tubular trunnion section 12 around pin 19. The arc of the spherical surface 29 has a radius from a point which is centered in the cross pin and in the vertical plane of the tilt coupling. The top radially-extending flange 15 of the tubular support member 11 is welded to a missile frame or similar structure which is fixed relative the other parts of the tilt coupling.

Referring to the bottom of the tilt coupling, it can be seen that the washer-like mounting plate or flange 37 has the same outer diameter as the top flange 15 and has a central opening 39. An arch member 41 extends upward from plate 37. Arch member 41 has, at the bottom, radially-outwardly-extending, side wall flanges 43 mounted on the top surface of plate 37 and attached thereto by bolts 45 (one appearing). Extending up from flanges 43, the vertical side walls 47 and 48 of arch member 41 provides an interior space 49 in the upper part of which is located the ball-like element 27 and part of cross pin 19. The side walls have left and right round openings 51 and 53 for cross pin 19 which are of sufficient size to give clearance for limited tilting of the arch member 41. Like clearance exists between the inner part of trunnion element 41 and flanges 43. The mounting flange or plate 37 will have attached thereto, by welding, a small rocket motor or other device which produces thrust.

The top transverse wall 55 of the arch member 41 has a top convex surface 57 opposite space 49, facing vertically or outwardly. This convex surface 57 is a segment of a spherical surface which has about the same radius as the ball-like element 27. It is to be noted that the inner surface of transverse wall 55 does not contact the ball-like element 27 since there is a slight clearance or gap when arch member 41 is loaded as shown on the drawing.

Above the convex surface 57 at the top of the arch member 41, there is a part of square-O-shaped rocker element 61 which extends down each side spaced from the back and front parts of transverse wall 55 and of ball-like element 27 and then under the ball-like element 27. The rocker element 61 has a transverse upper or top wall 63 extending over the convex surface 57 of the arch member 41, two side walls 65 (one appearing), and a bottom transverse wall 67 extending through the space between the upright side walls 47 and 48 of the arch member 41. In FIGURE 2, the rocker 61 is slightly inclined relative to arch 41 since the tilt is very slightly less. The top wall 63 has an interior concave surface 69 which faces and rolls on surface 57 of arch member 41. Surface 69 has a slightly larger radius than surface 57. The lower wall 67 of rocker element 61 also has an inner concave surface 71 and this surface faces and rolls on the lower spherical surface 29 of the ball-like element 27. The leaf springs 73 and 75 are fastened by screws 77 into the top wall 55 of arch member 41 and abut the sides of the top wall of the rocker element 61 to position it in alignment with arch member 41 when not under load. A wavy-washer spring 78 is positioned in a recess 79 in the exterior surface of the bottom wall 67 of the rocker element 61 for the same purpose.

In FIGURE 1, it can be seen that a cylindrical-like lattice spring 91 extends vertically between the parallel flanges 15 and 37. The left side of lattice spring 91 is cross-sectioned in both FIGURES 1 and 2 through a plane which is at forty-five degrees angle to the plane of the drawing board paper for the purpose of better illustration. The curved beam lattice spring 91 shown has hollow four-sided flat spring rings and vertical post sections and circular attachment rings as will be described. However, it is to be understood that the flexible rings and post parts can be similar to the solid rings (rather than hollow) as shown in U.S. Patent No. 3,071,-942 or in pending U.S. application Serial No. 246,976 (having the same assignee as this application).

The cylindrical-like lattice spring 91 includes a plurality of flexible hollow spring rings 93A–E uniformly-spaced axially and with connecting post sections which are alternately-aligned in perpendicular axial planes. At the right, the post 94A extends from attachment ring section 95 to the first hollow spring ring section 93A as does the left post (not appearing) at a diametrical location and thus provide a first pair of posts in a first axial plane.

Section 95 is attached to flange 15 by bolts 96. A front post together with a back post diametrical thereof (neither appearing) provides a pair of posts extending from the underside of the first spring ring 93A to the top of the second spring ring 93B. This second pair of posts are in a second axial plane which is perpendicular to the first axial plane. The second and third rings 93B and 93C are connected by another pair of post sections at the sides including post section 94B and thus are aligned with first side posts. The third flat hollow spring 93C is connected by a front post and its back mate (neither appearing) to the facing side of the fourth spring ring 93D. Left and right side post sections 94C connect rings 93D and 93E. Finally, the fifth spring ring or hollow annulus 93E is connected to an end attachment ring 97 by a like pair of front and back posts. Ring 97 is connected to flange 37 by shrunk-fit pins 98 (one appearing). This arrangement of posts and spring rings provides a cylindrical-like lattice spring which has alternately-aligned posts in perpendicular axial planes whereby the lattice spring can be compressed at any side and extended at the opposite side.

The operation of the tilt coupling, in respect the lattice spring 91 and the upper flange 15 and lower flange 37, is believed to be apparent from the foregoing. It can be realized, with reference to FIGURE 2, that limited tilting can be effected with flexing of the lattice spring 91, as suggested in the drawing. Thus, assuming that the mounting flange 15 is attached to a fixed support such as a missile frame and a device such as a rocket which is to be tilted is connected to lower flange or the tilt plate 37, it is clear that inclination of the device and tilt flange 37 causes compression and extension of the low rate lattice spring 91 as shown. Any turning moment or torsional force applied to the tilt plate 37 is restrained by the lattice spring 91 which has high torsional stiffness.

The rolling action between the rocker 61 at the location where the concave surface 71 in lower rocker wall 67 contacts the convex surface 29 of ball-like element 19 and a similar rolling action between convex surface 57 and concave surface 64 at the top wall 63 of the rocker 61 will be described with reference to FIGURES 1 and 2. At the beginning, as shown in FIGURE 1, the upward thrust or axial force through the center line of annular tilt flange 37 directed along a vertically-extending axially-centered line which passes through the contact point of surfaces 29 and 71, the center of the ball-like element 27, and the contact point of surfaces 57 and 69. There is no resultant moment about the point of contact between surfaces 29 and 71. When a disturbing moment is generated by applying an external force to tilt the thrust device connected to flange 37, the temporary line of thrust goes through a line slightly inclined to the vertical and passing through the contact point between surfaces 57 and 69. A rolling action between rocker 61 and arch member 41 for a small arc results. The moment also causes rocker 61 to roll along a small arc on ball-like element 27 until a condition is reached at which the thrust line passes through the upper and lower contact points and there is not a resultant force to cause rocker 61 to roll on ball-like element 27. It is to be noted that, since the moment from the thrust is used to rotate the rocker 61, only a small external actuating force is required, being sufficient to overcome the lattice spring's low rate and a very small rolling friction. High sliding friction is avoided since only the force required to roll a spherical from another spherical form. Since the differential radii are nearly equal, the Hertz crushing force is low.

Axial forces derived from tilted device and acting on the inclined tilt plate 37 to urge it toward the mounting flange 15 are opposed at the cross pin 19 by the action at surfaces 57 and 61 and at surface 71 which contacts surface 29 of the ball-like element carried by cross pin 19. With this arrangement, it requires little force to adjust the inclination of the tilted device, since little friction occurs with the rolling between the ball-like element 27 and the lower concave 71 of rocker 61 and between the convex surface 57 of the arch member 41 and the concave surface 64 of the rocker 61. When the tilt coupling is returned to its normal position, as shown in FIGURE 1, and axial forces are not acting on the tilt flange 37, top wall 55 of the arch member 41 bears against the ball-like element 27 carried by the cross pin 19 of the upper attachment means 11 since the downward pull of the device previously tilted will close the gap which is shown in FIGURE 1 with the coupling subject to upward urging. The leaf springs 73 and 75 bearing against the sides of the top wall 63 of the rocker 61 and the wavy-washer spring 78 will then position the slightly tilted rocker 61 (now unloaded) relative the arch member 41 as shown aligned in FIGURE 1 so that the previously-described rolling action between the concave and convex surfaces will result.

It is to be understood that changes can be made by persons skilled in the art in the disclosed coupling, without departing from the invention, as set forth in the appended claims.

What is claimed is:

1. A tilt coupling for attaching a device to a support to provide for universal tilting of the device with restraint to axial and torsional forces derived from the device comprised of:

upper attachment means having a circular flange for attachment to support means, lower attachment means having a circular flange for connecting to a device from which axially-upward and torsion forces are derived, said lower attachment means being vertically spaced from said upper attachment means and arranged so that said flanges are parallel to each other, cylindrical lattice spring means extending between said flanges, said upper attachment means having trunnion structure extending axially and downwardly within said cylindrical lattice spring means and providing a lower convex surface centered on the axis of said cylindrical lattice spring means and facing downwardly, said lower attachment means having rocker structure extending upwardly within said trunnion structure and providing an upwardly-facing upper convex surface centered on the axis of said cylindrical lattice spring means, rocker means providing an upper concave surface and a lower concave surface, said upper concave surface of said rocker means facing said upper convex surface of said lower attachment means and having radius slightly larger than said upper convex surface to provide limited rolling on said upper convex surface, said lower concave surface of said rocker means facing said lower convex surface of said upper attachment means and having a radius slightly larger than said lower convex surface to provide limited rolling on said lower convex surface, said lattice spring and said convex and concave surfaces being so designed that a relatively small force is required for initial tilting of said lower attachment means when subject to an upwardly-directed force since such force causes rolling of said concave surfaces on the respective facing convex surfaces for further tilting and extension and compression of said lattice spring, and said lattice spring providing restraint to torsional forces acting on said lower attachment means.

2. The tilt coupling according to claim 1 and being further characterized by:

said downwardly-extending trunnion structure having two side walls and a cross-pin having a ball-like element thereon providing said lower convex surface, and said upwardly-extending rocker structure being an arch member having two apertured side walls receiving said cross pin and a top wall having said upper convex surface.

3. The tilt coupling according to claim 1 and being further characterized by:
spring means extending between said rocker means and said rocker structure of said lower attachment means constructed and arranged to align said rocker means when the coupling is not loaded.

4. The tilt coupling according to claim 1 and being further characterized by:
said downwardly-extending trunnion structure having two side walls and a cross-pin having a ball-like element thereon providing said lower convex surface,
said upwardly-extending rocker structure being an arch member having two apertured side walls receiving said cross pin and a top wall having said upper convex surface, and
spring means extending between said rocker means and said rocker structure of said lower attachment means constructed and arranged to align said rocker means when the coupling is not loaded.

5. A tilt coupling for attaching a device to a support to provide for universal tilting of the device with restraint to axial and torsional forces derived from the device comprised of:
upper attachment means having a circular flange for attachment to support means,
lower attachment means having a circular flange for connecting to a device from which axially-upward and torsion forces are derived,
said lower attachment means being vertically spaced from said upper attachment means and arranged so that said flanges are parallel to each other,
cylindrical lattice spring means extending between and attached to said flanges,
said upper attachment means having trunnion structure extending axially and downwardly within said cylindrical lattice spring means and having cross-pin with ball-like element mounted thereon providing a lower convex surface centered on the axis of said cylindrical lattice spring means and facing downwardly,
said lower attachment means having arch structure extending upwardly within said trunnion structure and having a top wall providing an upwardly-facing upper convex surface centered on the axis of said cylindrical lattice spring,
square-O-shaped rocker means extending over said arch top wall and under said ball-like element and providing an upper concave surface and a lower concave surface,
said upper concave surface of said rocker means facing said upper convex surface of said top wall of said arch structure and having radius slightly larger than said upper convex surface to provide limited rolling on said upper convex surface,
said lower concave surface of said rocker means facing said lower convex surface of said ball-like element and having a radius slightly larger than said lower convex surface to provide limited rolling on said lower convex surface,
spring means arranged to align said rocker means when the coupling is not under load,
said lattice spring and said convex and concave surfaces being so designed that a relatively small force is required for operation when said lower attachment means subject to an upwardly-directed force since such force causes rolling of said concave surfaces on the respective facing convex surfaces for tilting and extension and compression of said lattice spring means, and
said lattice spring means providing restraint to torsional forces acting on said lower attachment means.

References Cited by the Examiner
UNITED STATES PATENTS

| | | | |
|---|---|---|---|
| 2,245,764 | 6/41 | Dome | 64—15 |
| 2,680,005 | 6/54 | Storm | 287—87 X |
| 2,917,910 | 12/59 | Herbenar | 64—15 |
| 2,924,417 | 2/60 | Bodian | 248—343 |
| 2,984,997 | 5/61 | Wight | 64—21 |
| 3,071,942 | 1/63 | Alcaro | 64—15 |

CLAUDE A. LE ROY, *Primary Examiner.*